(12) United States Patent
Tada et al.

(10) Patent No.: US 10,479,139 B2
(45) Date of Patent: Nov. 19, 2019

(54) WHEEL BEARING APPARATUS

(71) Applicant: NTN Corporation, Osaka-shi (JP)

(72) Inventors: Motohiro Tada, Iwata (JP); Tadashi Mitsuishi, Iwata (JP)

(73) Assignee: NTN Corporation, Osaka-shi (JP)

(*) Notice: Subject to any disclaimer, the term of this patent is extended or adjusted under 35 U.S.C. 154(b) by 0 days.

(21) Appl. No.: 15/907,617

(22) Filed: Feb. 28, 2018

(65) Prior Publication Data

US 2018/0186181 A1 Jul. 5, 2018

Related U.S. Application Data

(63) Continuation of application No. PCT/JP2016/075558, filed on Aug. 31, 2016.

(30) Foreign Application Priority Data

Aug. 31, 2015 (JP) ................................. 2015-170411

(51) Int. Cl.
*B60B 27/00* (2006.01)
*F16J 15/447* (2006.01)
(Continued)

(52) U.S. Cl.
CPC ...... *B60B 27/0073* (2013.01); *B60B 27/0094* (2013.01); *F16C 19/186* (2013.01);
(Continued)

(58) Field of Classification Search
CPC .............. F16C 33/7823; F16C 33/7853; F16C 33/7866; F16C 33/7876; F16C 33/7879;
(Continued)

(56) References Cited

U.S. PATENT DOCUMENTS 8,979,385 B2* 3/2015 Haepp ................. F16C 33/7886
384/480
9,695,938 B2* 7/2017 Suzuki ................. F16J 15/3256
(Continued)

FOREIGN PATENT DOCUMENTS

CN 103542004 A 1/2014
DE 102013218635 A1 3/2015
(Continued)

OTHER PUBLICATIONS

Chinese Office Action dated Mar. 1, 2019 in corresponding Chinese Application No. 201680049688.X.

*Primary Examiner* — James Pilkington
(74) *Attorney, Agent, or Firm* — Harness, Dickey & Pierce, P.L.C.

(57) ABSTRACT

A wheel bearing apparatus has a seal (8) with a metal core (15) and a sealing member (6). The sealing member (6) has a first side lip (16a), a second side lip (16b) and a third side lip (19c). The first side lip (16a) opposes a metal annulus (17) via an axial gap. The second side lip (16b) is in sliding contact with a base (18), via an axial interference. The third side lip (19a) covers the outer surface of the metal core (15). The tip end of the third side lip (19a) is formed with a vertically flat surface opposing the inner-side surface (4b) of the wheel mounting flange (4, 28), via an axial gap (S1), to form a first labyrinth seal (20). The outer edge of the metal annulus (17) opposes the sealing member (6), via an axial gap, to form a second labyrinth seal (25).

8 Claims, 5 Drawing Sheets

(51) Int. Cl.
*F16C 19/18* (2006.01)
*F16C 33/78* (2006.01)
*F16C 33/80* (2006.01)
*F16J 15/16* (2006.01)
*F16J 15/3232* (2016.01)
*F16J 15/3264* (2016.01)

(52) U.S. Cl.
CPC ........ *F16C 33/782* (2013.01); *F16C 33/7876* (2013.01); *F16C 33/7879* (2013.01); *F16C 33/805* (2013.01); *F16J 15/164* (2013.01); *F16J 15/3232* (2013.01); *F16J 15/3264* (2013.01); *F16J 15/447* (2013.01); *B60B 27/0005* (2013.01); *B60B 2900/211* (2013.01); *B60B 2900/5112* (2013.01); *B60B 2900/5114* (2013.01); *B60B 2900/5118* (2013.01); *F16C 2240/46* (2013.01); *F16C 2326/02* (2013.01)

(58) Field of Classification Search
CPC .... F16C 33/7896; F16C 33/80; F16C 33/805; B60B 27/0073
See application file for complete search history.

(56) References Cited

U.S. PATENT DOCUMENTS

| | | | |
|---|---|---|---|
| 2007/0278748 A1* | 12/2007 | Matsui | F16C 33/7869 277/549 |
| 2013/0024172 A1 | 1/2013 | Suyama et al. | |
| 2013/0241270 A1 | 9/2013 | Morita | |
| 2014/0037239 A1 | 2/2014 | Duch et al. | |
| 2015/0003766 A1 | 1/2015 | Duch et al. | |
| 2016/0003302 A1* | 1/2016 | Seno | F16J 15/3264 277/351 |
| 2016/0114624 A1* | 4/2016 | Morello | B60B 27/0005 384/480 |
| 2016/0178010 A1 | 6/2016 | Kaiser et al. | |
| 2016/0245340 A1* | 8/2016 | Kaiser | F16C 33/7863 |

FOREIGN PATENT DOCUMENTS

| | | |
|---|---|---|
| JP | H07-034226 U | 6/1995 |
| JP | 2008-115998 A | 5/2008 |
| JP | 2010-065800 A | 3/2010 |
| JP | 2010-106925 A | 5/2010 |
| JP | 2010-185465 A | 8/2010 |
| JP | 2011-080575 A | 4/2011 |
| JP | 2011-088513 A | 5/2011 |
| JP | 2012-056411 A | 3/2012 |
| JP | 2012-097817 A | 5/2012 |
| JP | 2012-154374 A | 8/2012 |
| JP | 2013-032823 A | 2/2013 |
| JP | 2013-200039 A | 10/2013 |
| JP | 2013-234748 A | 11/2013 |
| JP | 2013-245815 A | 12/2013 |
| JP | 2014-240679 A | 12/2014 |
| JP | 2015-052350 A | 3/2015 |

* cited by examiner

WHEEL BEARING APPARATUS

CROSS-REFERENCE TO RELATED APPLICATIONS

This application is a continuation of International Application No. PCT/JP2016/075558, filed Aug. 31, 2016, which claims priority to Japanese Application No. 2015-170411, filed Aug. 31, 2015. The disclosures of the above applications are incorporating herein by reference.

FIELD

The present disclosure relates to wheel bearing apparatus that rotationally supports a wheel of a vehicle, such as an automobile, relative to its suspension apparatus. More particularly, the wheel bearing apparatus intends to extend the life of bearing while reducing a "seal torque" (i.e. torque resistance caused by seal) as well as improve the sealability of the bearing.

BACKGROUND

Heretofore, the wheel bearing apparatus for supporting a wheel of vehicle is used for rotationally supporting a wheel hub for mounting a wheel via a double row rolling bearing and there are those for a driving wheel and for a driven wheel. From reasons of structure, the inner ring rotation type is used for the driving wheel and both the inner ring rotation type and the outer ring rotation type are used for the driven wheel. In general, the wheel bearing apparatus is roughly classified into a first generation type in which a double row angular contact ball bearing is arranged between a knuckle forming a portion of a suspension apparatus and a wheel hub, a second generation type in which a body mounting flange or a wheel mounting flange is directly formed on an outer circumference of an outer member, a third generation type in which one of inner raceway surfaces is directly formed on an outer circumference of the wheel hub, or a fourth generation type in which an inner raceway surface is directly formed respectively on the outer circumferences of the wheel hub and an outer joint member of a constant velocity universal joint.

Figure 4:
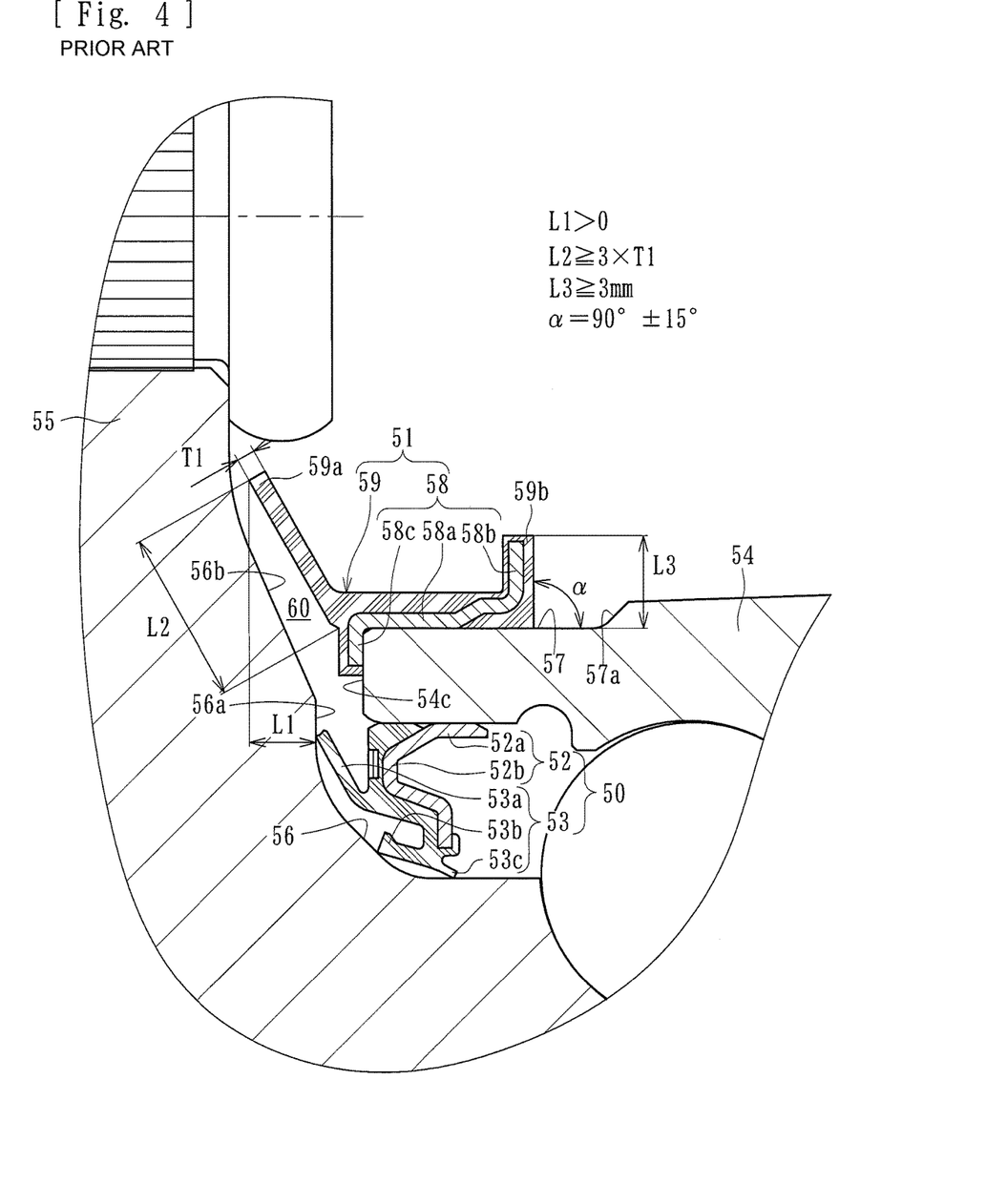
FIG. 4 is a partially enlarged cross-section view of a prior art sealing part of a wheel bearing apparatus.

In these wheel bearing apparatus, it is usually equipped with seals having tough sealability for preventing leakage of grease filled in the inside of the bearing as well as preventing enter of rain water or muddy water into the bearing. It has been proposed various kinds of seals having improved sealability and one example of which is shown in FIG. 4. This sealing apparatus comprises a first seal 50 and a second seal 51 arranged in a bearing space radially outward of the first seal 50. The first seal 50 comprises a metal core 52 and a sealing member 53 integrally adhered to the metal core 52 by vulcanized-adhesion. The metal core 52 is press-formed of steel sheet and comprises a cylindrical fitting part 52a fit into an inner circumference of an outer member 54 and an inner part 52b bent from the fitting part 52a and extending radially inward.

On the other hand, the sealing member 53 is formed of synthetic rubber and comprises a side lip 53a and a dust lip 53b secured on an inner end of the inner part 52b of the metal core 52 and inclining radially outward and slide-contacting with a wall surface 56a of a base 56 of a wheel mounting flange 55 via an axial interference, and a radial lip 53c extending radially inward from a base of the dust lip 53b. The radial lip 53c slide-contacts with an outer surface of the base 56 via a radial interference to prevent grease filled in the bearing from flowing out.

The second seal 51 is mounted in the bearing space outside of the first seal 50 and comprises a metal core 58 and a sealing member 59 integrally adhered to the metal core 58 by vulcanized adhesion. The metal core 58 comprises a cylindrical part 58a press-fit onto an outer circumference 57 of the outer member 54, an upstanding flat part 58b extending radially outward, and a flanged part 58c closely contacted with an end face 54c of the outer member 54. The sealing member 59 comprises a dam part 59b and a side lip 59a integrated with the dam part 59b and inclined toward radially outward. The side lip 59a is arranged so that it lies along an inclined part 56b of the wheel mounting flange 55 and opposes thereto via a predetermined gap to form a labyrinth seal 60. The side lip 59a of the second seal 51 is arranged at a position offset from the side lip 53a of the first seal 50 so that the side lip 59a is at a position axially outer than that of the side lip 53a. That is, a tip end of the side lip 59a is arranged at a position so that it is offset axially outward from a wall surface 56a of the base 56 by a distance L1 (L1>0), and the length L2 of the side lip 59a is set larger 3 times or more than its thickness T1 (L2≥3T1). This makes it possible to prevent muddy water etc. from directly entering into the first seal 50. In addition, when a large quantity of muddy water etc. splash over the side lip 59a of the second seal 51, the side lip 59a would be deformed by the pressing force of the muddy water and slide-contacted against the inclined part 56b of the wheel mounting flange 55 and thus the side lip 59a would form a temporally contacting seal under a heavy travelling condition and effectively improve the sealability.

In addition, a height L3 of the dam part 59b is higher than that of a tapered part 57a of the outer circumference 57 of the outer member 54 and set at 3 mm or more and an angle α of the dam part 59b is set at 90°±15°. This makes it possible to surely prevent rain water or muddy water fallen on the outer member during travel of a vehicle from flowing into a space between the wheel mounting flange 55 and the outer member 54 and then to smoothly discharge the rain water or muddy water downward through an annular space formed by the dam part 59b of the second seal 51 and the tapered part 57a (see, e.g., JP2013-032823A).

Figure 5:
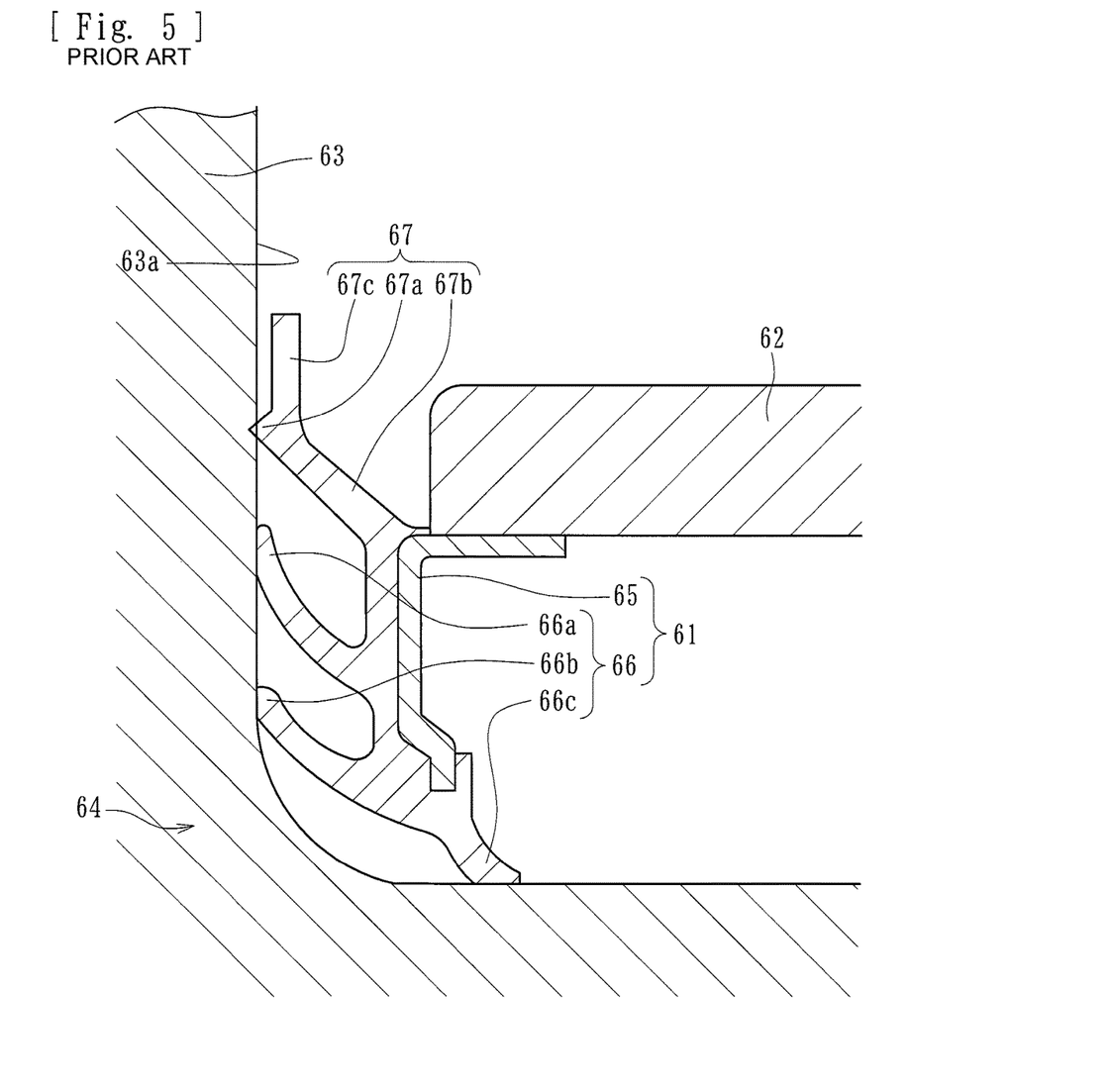
FIG. 5 is a partially enlarged cross-section view showing another prior art sealing part of a wheel bearing apparatus.

It is also known a seal 61 shown in FIG. 5. This seal 61 comprises a metal core 65 mounted between an outer member 62 and a wheel hub 64 integrally formed with a wheel mounting flange 63, and a sealing member 66 having four lips integrally adhered to the metal core 65 by vulcanized adhesion.

The sealing member 66 is formed so that it is inclined toward the wheel mounting flange 63 and comprises two side lips 66a, 66b adapted to be elastically contacted with a side surface 63a of the wheel mounting flange 63, a single radial lip 66c and an outer lip 67 positioned radially outside of the side lip 66a and inclined toward the wheel mounting flange 63. The outer lip 67 comprises a projection part 67a projected toward the wheel mounting flange 63, an inclined part 67b extending radially outward toward the side surface 63a of the wheel mounting flange 63, an upstanding part 67c extending from a tip end of the inclined part 67b substantially in parallel with the side surface 63a of the wheel mounting flange 63. This makes it possible to provide the seal 61 which is able to suppress increase of the rotational torque, superior in sealability and has a long sealing life although it has the outer lip 67 (see, e.g., JP2013-200039 A).

In the seal of the prior art shown in FIG. 4, it is possible to prevent muddy water etc. from directly entering to the first seal 50 and improve the sealability due to a temporal seal which is formed by deformation of the side lip 59a and therefore its slide-contact with the inclined part 56b of the wheel mounting flange 55 caused by pressing force applied onto side lip 59a by a large quantity of muddy water entered on the side lip 59a under a heavy travelling condition. On the contrary, in addition to this slide-contact with the wheel mounting flange 55, since the side lip 53a of the first seal 50 is also slide-contacted with the wall surface 56a of the base 56 of the wheel mounting flange, the seal torque and thus the fuel consumption of a vehicle would be necessarily increased.

Similarly to the seal of FIG. 4, increase of the seal torque could not be denied also in the seal 61 of FIG. 5, since two side lips 66a, 66b are always slide-contacted with the side surface 63a of the wheel mounting flange 63.

SUMMARY

It is therefore an object of the present disclosure to provide a wheel bearing apparatus that can extend the life of a bearing while improving the sealability of the seal without increasing the seal torque by providing a non-contact type side lip to suppress the rotational slide resistance and by forming double labyrinth seal to supplement the reduction of sealability due to the non-contact type side lips.

To achieve the object of the present disclosure, a wheel bearing apparatus comprises an outer member formed on its outer circumference with a body mounting flange to be mounted on a knuckle forming a portion of a suspension apparatus and on its inner circumference with double row outer raceway surfaces. An inner member includes a wheel hub and an inner ring or an outer joint member of a constant velocity universal joint. The wheel hub is formed on its one end with a wheel mounting flange and on its outer circumference with one inner raceway surface opposing to one outer raceway surface of the double row outer raceway surfaces. A cylindrical portion axially extends from the inner raceway surface. The inner ring or an outer joint member of a constant velocity universal joint being press-fit onto the wheel hub and formed on its outer circumference with the other inner raceway surface opposing to the other outer raceway surface of the double row outer raceway surfaces. Double row rolling elements are freely rollably accommodated between the outer and inner raceway surfaces of the outer and inner members. A seal is mounted within an outer-side opening of an annular space formed between the outer member and the inner member. The seal is formed of an integrated seal comprising a metal core fit into an outer-side end inner circumference of the outer member and a sealing member integrally adhered to the metal core by vulcanized adhesion and having a plurality of sealing lips. The metal core is press-formed of steel sheet and comprises a cylindrical fitting part adapted to be fit into the outer-side end inner circumference of the outer member, a radially inner part bent from the fitting part and extending radially inward, an annular flat part extending radially outward from the outer-side end of the fitting part and adapted to be closely contacted with the outer-side end face of the outer member, and a cylindrical flanged part formed on the radially outermost end of the annular flat part and extending toward the inner-side. The sealing member is formed of synthetic rubber and adhered to the metal core in a range from the radially innermost end of the radially inner part to the flanged part via the fitting part and the annular flat part. The sealing member comprises a first side lip formed so that it inclines radially outward from the radially inner part of the metal core and is adapted to be opposed to an inner-side base of the wheel mounting flange via an axial gap, a second side lip formed radially inward of the first side lip and adapted to be sliding contacted with the base via an axial interference, a radial lip extending from a base of the second side lip and inclined radially inward therefrom toward the inner side and a third side lip adhered to the flanged part of the metal core so that it covers the whole surface of the flanged part and extending radially outward from its base toward the wheel mounting flange. The tip end of the third side lip is formed with a vertically flat surface oppose in the inner-side surface of the wheel mounting flange, via an axial gap, to form a first labyrinth seal. A second labyrinth seal is formed at a position between the first labyrinth seal and the first side lip opposed to the inner-side base of the wheel mounting flange via an axial gap.

According to the present disclosure, a seal is mounted within an outer-side opening of an annular space formed between the outer member and the inner member. The seal is formed of an integrated seal comprising a metal core fit into an outer-side end inner circumference of the outer member and a sealing member integrally adhered to the metal core by vulcanized adhesion and having a plurality of sealing lips. The metal core is press-formed of steel sheet and comprises a cylindrical fitting part adapted to be fit into the outer-side end inner circumference of the outer member, a radially inner part bent from the fitting part and extending radially inward, an annular flat part extending radially outward from the outer-side end of the fitting part and adapted to be closely contacted with the outer-side end face of the outer member. A cylindrical flanged part formed on the radially outermost end of the annular flat part and extending toward the inner-side. The sealing member is formed of synthetic rubber and adhered to the metal core in a range from the radially innermost end of the radially inner part to the flanged part via the fitting part and the annular flat part. The sealing member comprises a first side lip formed so that it inclines radially outward from the radially inner part of the metal core and is adapted to be opposed to an inner-side base of the wheel mounting flange, via an axial gap. A second side lip is formed radially inward of the first side lip and adapted to be sliding contacted with the base, via an axial interference. A radial lip extends from a base of the second side lip and is inclined radially inward therefrom toward the inner side. A third side lip is adhered to the flanged part of the metal core so that it covers the entire surface of the flanged part and extends radially outward from its base toward the wheel mounting flange. The tip end of the third side lip is formed with a vertically flat surface opposite to the inner-side surface of the wheel mounting flange, via an axial gap, to form a first labyrinth seal. A second labyrinth seal is formed at a position between the first labyrinth seal and the first side lip opposite to the inner-side base of the wheel mounting flange, via an axial gap. Thus, it is possible to provide a wheel bearing apparatus that can prevent muddy water etc. from directly entering into the radially inner side lip without increasing the seal torque and extend the life of the bearing by improving the sealability of the seal.

A small diameter part, with a diameter smaller than that of an outer-side outer circumference of the outer member, is formed adjacent to the outer-side outer circumference, via a tapered part. A radially inwardly projected annular projection is formed on the base of the sealing member. Thus, the projection is in elastically close-contact with the small diameter part. This makes it possible to improve the sealability of seal as well as to prevent the generation of rust in a contact region between the metal core and the outer member. In addition, since the base of the sealing member functions as a dam and a gutter-like annular space is formed by the base and the small diameter part and the tapered part of the outer member, muddy water etc. flowing through the outer circumference of the outer member flows downward along the gutter-like annular space and is discharged. Thus, it is possible to prevent muddy water etc. from flowing between the wheel mounting flange and the outer member. Thus, high sealability can be attained.

A metal annulus is fit onto the inner-side base of the wheel mounting flange. The seal is arranged so that it opposes the metal annulus. The annulus is press-formed of a steel sheet and comprises a cylindrical fitting part to be fit onto a shoulder part of the wheel hub, a curved part having a circular arc cross section corresponding to the base having a circular arc cross section, an annular flat part extending radially outward from the curved part and adapted to be closely contacted with the inner-side surface of the wheel mounting flange via an elastic member, a bent part extending radially outward from the radially outermost part of the annular flat part and axially apart from the wheel mounting flange. The inner-side base of the wheel mounting flange has a circular arc cross section of the radius of curvature "r". The curved part of the metal annulus has a circular arc cross section of the radius of curvature "R". The respective radii of curvatures R, r is set as R≥r. This makes it possible to prevent the curved part of the metal annulus from being interfered by the circular arc part of the base of the wheel mounting flange and risen up therefrom when the metal annulus is fit onto the base.

A friction coefficient reduction treatment is performed on a surface of the metal annulus. This makes it possible to suppress lip wear and thus reduce seal torque.

The elastic member of synthetic rubber is integrally adhered to a region of the annular flat part and bent part of the metal annulus and elastically contacts a wall surface of the base of the wheel mounting flange. An elastic lip, inclined radially outward, is integrally formed on the elastic member and extends from a tip end part of the elastic member adhered to a tip of the bent part of the metal annulus while covering therearound to the wall surface of the base. This makes it possible to prevent foreign matters from entering into a space between the base of the wheel mounting flange and the annular flat part of the metal annulus. Thus, this reduces the generation of rust on the base of the wheel mounting flange on which the metal annulus is fit.

An annular recessed part is formed on a surface of the sealing member opposite to the wall surface of the inner-side base of the wheel mounting flange. The tip end part of the elastic member faces the recessed part, via an axial gap, to form a crank-shaped second labyrinth seal. This makes it possible to prevent muddy water etc. entering through the labyrinth seal of the side lip from directly entering to the radial inner side lip.

An axially extending annular projection is formed on the wall surface of the inner-side base of the wheel mounting flange. The annular projection is formed so that its tip end has a vertically flat surface. It is formed with a cross section having a spire-like shape. The annular projection opposes the sealing member via an axial gap to form a labyrinth seal. This makes it possible to prevent muddy water etc. entering through the labyrinth seal of the side lip from directly entering to the radially inner side lip and thus to improve the sealability without increasing the seal torque.

A bifurcated tip end of the first side lip has a pair of lips. This makes it possible to further improve the sealability.

The bearing apparatus of the present disclosure comprises an outer member formed on its outer circumference with a body mounting flange to be mounted on a knuckle forming a portion of a suspension apparatus and on its inner circumference with double row outer raceway surfaces. An inner member includes a wheel hub and an inner ring or an outer joint member of a constant velocity universal joint. The wheel hub is formed on its one end with a wheel mounting flange and on its outer circumference with one inner raceway surface opposing to one outer raceway surface of the double row outer raceway surfaces. A cylindrical portion axially extends from the inner raceway surface. The inner ring or an outer joint member of a constant velocity universal joint is press-fit onto the wheel hub and includes, on its outer circumference, the other inner raceway surface opposing to the other outer raceway surface of the double row outer raceway surfaces. Double row rolling elements are freely rollably accommodated between the outer and inner raceway surfaces of the outer and inner members. A seal is mounted within an outer-side opening of an annular space formed between the outer member and the inner member. The seal is formed of an integrated seal comprising a metal core fit into an outer-side end inner circumference of the outer member and a sealing member integrally adhered to the metal core by vulcanized adhesion and having a plurality of sealing lips. The metal core is press-formed of steel sheet and comprises a cylindrical fitting part adapted to be fit into the outer-side end inner circumference of the outer member, a radially inner part bent from the fitting part and extending radially inward, an annular flat part extending radially outward from the outer-side end of the fitting part and adapted to be closely contacted with the outer-side end face of the outer member, and a cylindrical flanged part formed on the radially outermost end of the annular flat part and extending toward the inner-side. The sealing member is formed of synthetic rubber and adhered to the metal core in a range from the radially innermost end of the radially inner part to the flanged part via the fitting part and the annular flat part. The sealing member comprises a first side lip formed so that it inclines radially outward from the radially inner part of the metal core and is adapted to be opposed to an inner-side base of the wheel mounting flange via an axial gap, a second side lip formed radially inward of the first side lip and adapted to be sliding contacted with the base via an axial interference, a radial lip extending from a base of the second side lip and inclined radially inward therefrom toward the inner side and a third side lip adhered to the flanged part of the metal core so that it covers the entire surface of the flanged part and extending radially outward from its base toward the wheel mounting flange. The tip end of the third side lip is formed with a vertically flat surface opposing the inner-side surface of the wheel mounting flange, via an axial gap, to form a first labyrinth seal. A second labyrinth seal is formed at a position between the first labyrinth seal and the first side lip opposite to the inner-side base of the wheel mounting flange, via an axial gap. Thus, it is possible to provide a wheel bearing apparatus that can prevent muddy water etc. from directly entering into the radially inner side lip without increasing the seal torque and extend the life of the bearing by improving the sealability of the seal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The best mode for carrying out the present disclosure is with a wheel bearing apparatus comprising the following. An outer member has a body mounting flange formed on its outer circumference. The flange is mounted on a body of a vehicle. The outer member inner circumference includes double row outer raceway surfaces. An inner member includes a wheel hub and an inner ring. The wheel hub is formed on one end with a wheel mounting flange. The wheel hub outer circumference has one inner raceway surface opposing one outer raceway surface of the double row outer raceway surfaces. A cylindrical portion axially extends from the inner raceway surface. The inner ring is being press-fit onto the cylindrical portion of the wheel hub. The inner ring outer circumference includes the other inner raceway surface opposing the other outer raceway surface of the double row outer raceway surfaces. Double row rolling elements are freely rollably accommodated between the outer and inner raceway surfaces of the outer and inner members. A seal is mounted in an opening of an annular space formed between the outer member and the inner member. The seal is formed as an integrated seal comprising a metal core and a sealing member. The metal core is fit into an outer-side end inner circumference of the outer member. The sealing member is integrally adhered to the metal core by vulcanized adhesion. The sealing member has a plurality of sealing lips. The metal core is press-formed from a steel sheet and comprises a cylindrical fitting part, a radial inner part an annular flat part and a cylindrical flange. The cylindrical fitting part is fit into the outer-side end inner circumference of the outer member. The radially inner part is bent from the fitting part and extends radially inward. The annular flat part extends radially outward from the outer-side end of the fitting part. The annular flat part closely contacts the outer-side end face of the outer member. The cylindrical flange part is formed on the radially outermost end of the annular flat part. The cylindrical flange part extends toward the inner-side. The sealing member is formed from synthetic rubber and adhered to the metal core in a range from the radially innermost end of the radially inner part to the flanged part, via the fitting part and the annular flat part. The sealing member comprises a first through third side lip and a radial lip. The first side lip is inclined radially outward from the radially inner part of the metal core. The first side lip opposes an inner-side base of the wheel mounting flange, via an axial gap. The second side lip is formed radially inward of the first side lip. The second side lip slidingly contacts with the metal annulus, via an axial interference. The radial lip extends from a base of the second side lip and is inclined radially inward toward the inner side. The third side lip is adhered to the flanged part of the metal core so that it covers the entire surface of the flanged part and extends radially outward from its base toward the wheel mounting flange. A tip end of the third side lip is formed with a vertically flat surface that opposes the inner-side surface of the wheel mounting flange, via an axial gap, to form a first labyrinth seal. An outer edge part of the metal annulus opposes the sealing member, via an axial gap, to form a second labyrinth seal.

Preferred embodiments of the present disclosure will be hereinafter described with reference to the drawings.

Figure 1:
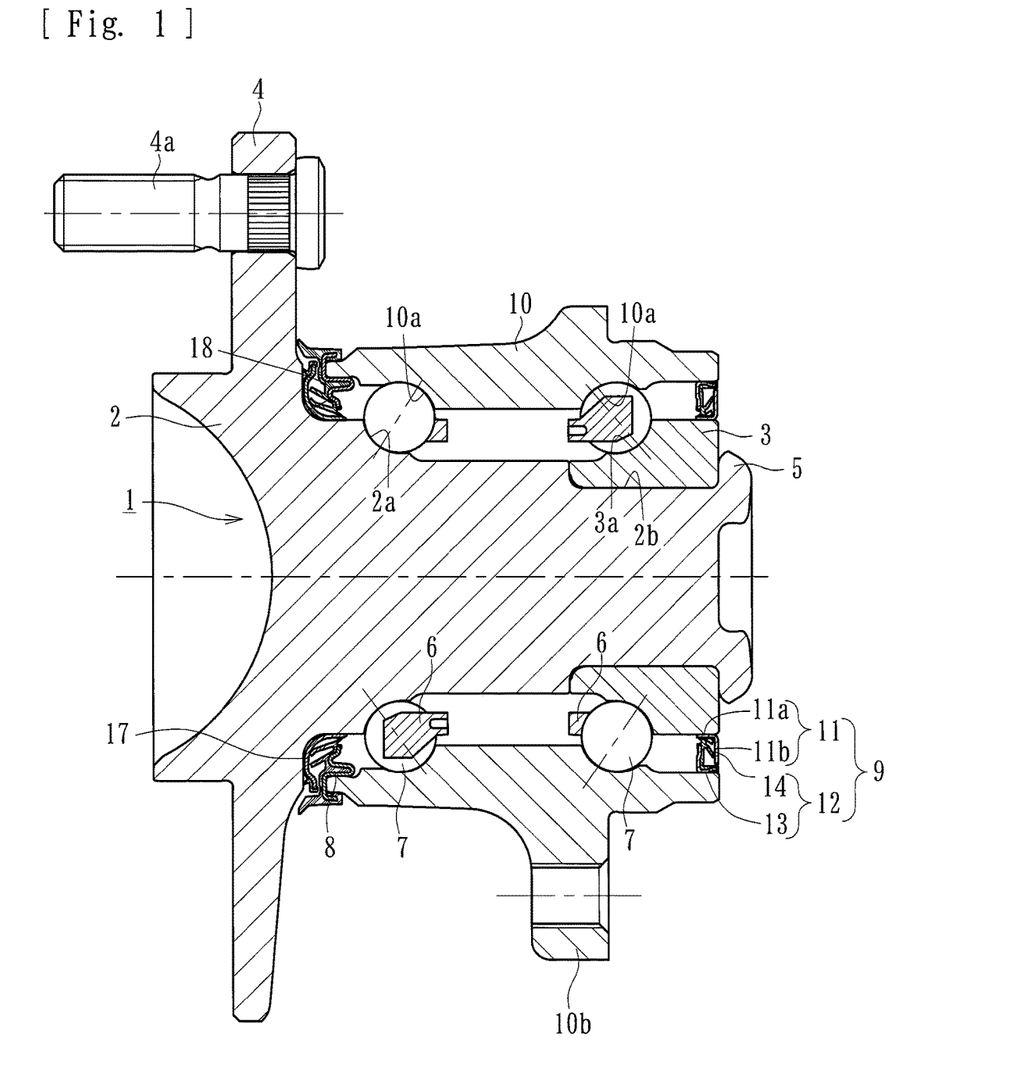
FIG. 1 is a longitudinal section view of a preferred embodiment of the wheel bearing apparatus of the present disclosure.
Figure 2:
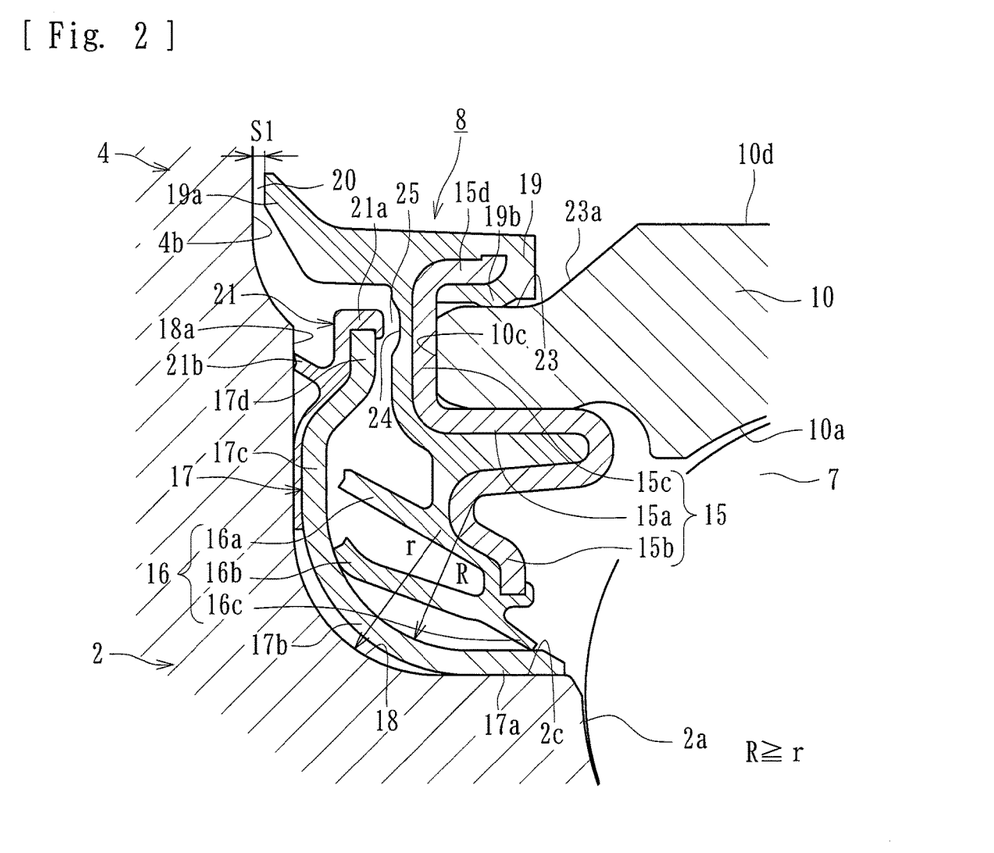
FIG. 2 is a partially enlarged cross-section view of a sealing part of FIG. 1.
Figure 3:
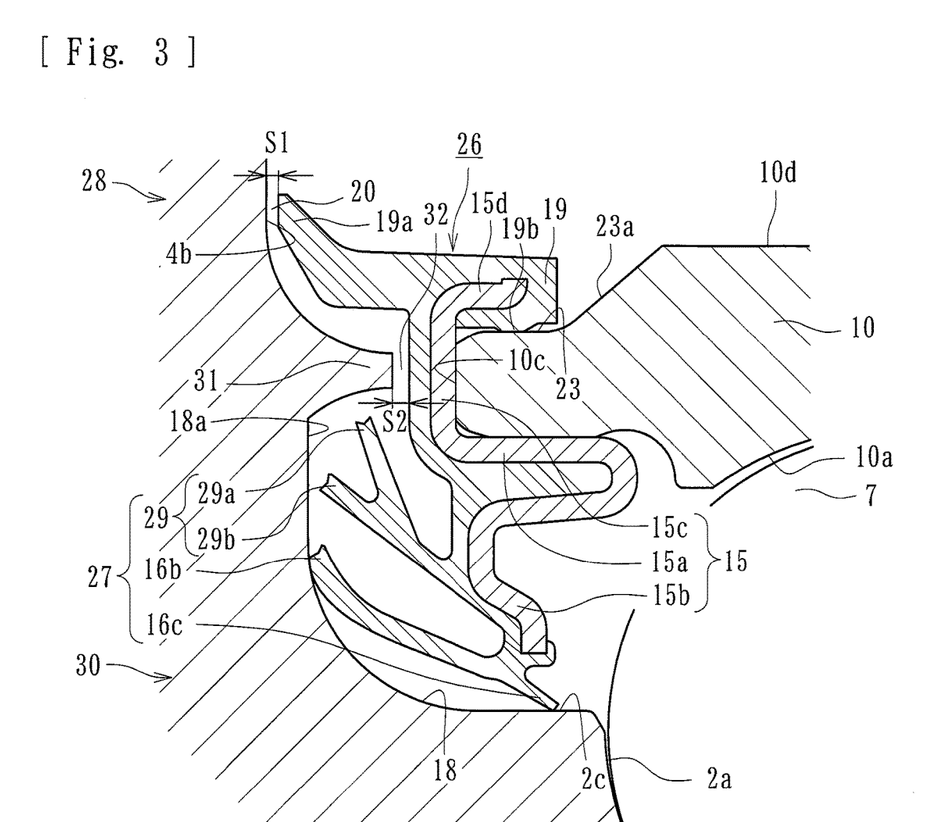
FIG. 3 is a partially enlarged cross-section view of a modified example of FIG. 2.

FIG. 1 is a longitudinal section view of one preferred embodiment of the wheel bearing apparatus. FIG. 2 is a partially enlarged cross-section view of a sealing part of FIG. 1. FIG. 3 is a partially enlarged cross-section view of a modified example of FIG. 2. In the descriptions below, the side positioned outer side of a vehicle body, when the wheel bearing apparatus is mounted on a vehicle, is referred to as "outer-side" (left side in drawings). The side is positioned inside of the vehicle body is referred to as "inner-side" (right side in drawings).

The wheel bearing apparatus shown in FIG. 1 is of a third generation type used for a driven wheel. It comprises an inner member 1, an outer member 10, and double row rolling elements (balls) 7, 7 rollably accommodated between the inner member 1 and the outer member 10. The inner member 1 comprises a wheel hub 2 and an inner ring 3 press-fit onto the wheel hub 2.

The wheel hub 2 is integrally formed with a wheel mounting flange 4 to mount a wheel (not shown) at its one end. One (outer-side) inner raceway surface 2a is on an outer circumference of the wheel hub. A cylindrical portion 2b axially extends from the inner raceway surface 2a. Hub bolts 4a are arranged on the wheel mounting flange 4 equidistantly along the periphery of the wheel mounting flange 4.

The inner ring 3 outer circumference includes the other (inner-side) inner raceway surface 3a. The inner ring 3 is press-fit onto the cylindrical portion 2b of the wheel hub 2, via a predetermined interference. It is axially secured on the wheel hub 2 by a caulked portion 5 that is formed by plastically deforming the end of the cylindrical portion 2b radially outward.

The wheel hub 2 is formed of medium/high carbon steel including carbon of 0.40 to 0.80% by weight such as S53C. It is hardened by high frequency induction quenching so that a region, from an inner-side base 18 of the wheel mounting flange 4 to the cylindrical portion 2b, is hardened to have a surface hardness of 58 to 64 HRC. The caulked portion 5 is not hardened and remains as an as is surface hardness after forging. The inner ring 3 is formed of high carbon chrome steel such as SUJ2. It is hardened to its core by dipping quenching to have a surface hardness of 58 to 64 HRC. Similarly to the inner ring 3, the rolling elements 7 are also formed of high carbon chrome steel such as SUJ2. They are hardened to their core by dipping quenching to have a surface hardness of 62 to 67 HRC.

The outer member 10 outer circumference is integrally formed with a body mounting flange 10b. The mounting flange 10b is to be mounted on a knuckle (not shown) to form a portion of a suspension apparatus. The outer member inner circumference includes double row outer raceway surfaces 10a, 10a positioned opposite to the inner raceway surfaces 2a, 3a of the inner member 1. Double row rolling elements 7, 7 are accommodated between these outer and inner raceway surfaces 2a, 3a and 10a, 10a. They are rollably held by cages 6, 6.

Similarly to the wheel hub 2, the outer member 10 is formed of medium/high carbon steel including carbon of 0.40 to 0.80% by weight such as S53C. At least the double row outer raceway surfaces 10a, 10a are hardened by high frequency induction quenching to have surface hardness of 58 to 64 HRC.

Seals 8, 9 are mounted on both ends of the outer member 10 and seal annular openings formed between the outer member 10 and the inner member 1. These seals 8, 9 prevent leakage of grease contained in the bearing and the entry of rainwater and dust inside the bearing.

The inner-side seal 9 of the seals 8, 9 is a so-called "pack seal". It comprises a slinger 11 and an annular sealing plate 12 arranged opposite toward each other. The slinger 11 is formed of austenitic-stainless steel sheet (JIS SUS 304 etc.) or preserved cold rolled steel sheet (JIS SPCC etc.). It is press-formed to have a substantially L-shaped cross section comprising a cylindrical part 11a and an upstanding part 11b. The cylindrical part 11a is press-fit onto the inner ring 3. The upstanding part 11b extends radially outward from the cylindrical part 11a.

The sealing plate 12 has a substantially L-shaped cross section and is mounted on the outer member 10 opposing the slinger 11. The sealing plate 12 comprises a metal core 13 and a sealing member 14. The metal core 13 is fit into the end part of the outer member 10. The sealing member 14 is adhered to the metal core 13 by vulcanized adhesion. The metal core 13 is press-formed from austenitic stainless steel sheet or preserved cold rolled steel sheet.

The sealing member 14 is formed from synthetic rubber such as NBR (acrylonitrile-butadiene rubber) and is integrally adhered to the metal core 13 by vulcanized adhesion. The sealing member 14 includes a side lip and radial lip slide-contacting the slinger 11.

There are example of materials of the sealing member 14 other than NBR, e.g. HNBR (hydrogenation acrylonitric-butadiene rubber) and EPDM (ethylene propylene rubber) etc., superior in heat resistance, and ACM (poly-acrylic rubber), FKM (fluororubber) or silicone rubber, superior in heat and chemical resistance.

Although shown here as a wheel bearing apparatus with double row angular contact ball bearing using balls as the rolling elements 7, the present disclosure is not limited to such a bearing and may include a double row taper roller bearing, using tapered rollers, as the rolling elements. In addition, although it is shown here as a third generation type, the present disclosure may be applied to a so-called second generation type where one pair of inner rings are press-fit onto the cylindrical portion of the wheel hub or to a fourth generation type where the inner raceway surfaces are directly formed, respectively, on the outer circumferences of a wheel hub and an outer joint member of the constant velocity universal joint, if they are inner ring rotation types.

As shown in the enlarged view of FIG. 2, the outer-side seal 8 is formed with an integrated seal comprising a metal core 15 and a sealing member 16. The metal core 15 is fit into an outer-side end inner circumference of the outer member 10. The sealing member 16 is integrally adhered to the metal core 15 by vulcanized adhesion. The sealing member 16 has a plurality of sealing lips. In this embodiment, a metal annulus 17 is fit onto the inner-side base 18 of the wheel mounting flange 4. The seal 8 is arranged opposite to the metal annulus 17.

The metal core 15 is press-formed of steel sheet such as austenitic-stainless steel sheet or preserved cold rolled steel sheet. It comprises a cylindrical fitting part 15a, a radial inner part 15b, an annular flat part 15c and a cylindrical flanged part 15d. The cylindrical fitting part 15a has a doubly bent shape and is fit into the outer-side end inner circumference of the outer member 10. The radial inner part 15b is bent from the fitting portion 15a and extends radially inward. The annular flat part 15c extends radially outward from the outer-side end of the fitting part 15a and closely contacts the outer-side end face 10c of the outer member 10. The cylindrical flanged part 15d is formed on the radially outermost end of the annular flat part 15c and extends toward the inner-side.

The sealing member 16 is formed of synthetic rubber such as NBR. It is adhered to the metal core 15 in a range from the radially innermost end of the radially inner part 15b to the flanged part 15d, via the fitting part 15a and the annular flat part 15c. The sealing member 16 comprises a first through third side lip and a radial lip 16c. The first side lip 16a inclines radially outward from the radially inner part 15b of the metal core 15. It opposes the annular flat part 17c of the metal annulus 17, via an axial gap. The second side lip 16b is in sliding contact with the curved part 17b of the metal annulus 17, via a predetermined axial interference. The radial lip 16c extends from a base of the second side lip 16b and is inclined radially inward toward the inner side. The radial lip 16c slide-contacts the outer circumference of the fitting part 17a of the metal annulus 17, via a predetermined radial interference, to prevent leakage of grease sealed in the bearing to the outside.

In addition, the third side lip 19a is adhered to the flanged part 15d of the metal core 15. Thus, it covers the entire surface of the flanged part 15d and extends radially outward from its base 19 toward the wheel mounting flange 4. A tip end of the third side lip 19a has a vertically flat surface opposite to the inner-side surface 4b of the wheel mounting flange 4, via a predetermined axial gap (first labyrinth gap) S1, to form a first labyrinth seal 20. This makes it possible to prevent muddy water etc. from directly entering into the first side lip 16a. Thus, this improves the sealability without increasing the seal torque.

The axial gap of the first labyrinth seal 20, the first labyrinth gap S1, is set in a range from 0.2 to 1.0 mm. This enables the first labyrinth gap S1 to remain as it is or the third side lip 19a would slightly slide-contact the side surface 4b of the wheel mounting flange 4 if a positioning accuracy of the seal 8 is set within ±0.1. This takes into consideration manufacturing variations of the thickness of the sealing member 16 as well as dimensional variations of the outer member 10 and the wheel mounting flange 4. On the contrary, if the first labyrinth gap S1 exceeds 1.0 mm, the labyrinth effect would be deteriorated.

A small diameter part 23, with a diameter smaller than that of an outer-side outer circumference 10d, of the outer member 10 is formed adjacent to the outer-side outer circumference 10d via a tapered part 23a. A radially inwardly projected annular projection 19b is formed on the base 19 of the sealing member 16. Thus, it is able to elastically close-contact the small diameter part 23. This makes it possible to improve the sealability of seal 8 as well as to prevent the generation of rust in a contact region between the metal core 15 and the outer member 10.

In addition, the base 19 of the sealing member 16 functions as a dam. A gutter-like annular space is formed by the base 19 and the small diameter part 23 and the tapered part 23a of the outer member 10. Thus, muddy water etc. flowing through the outer circumference 10d of the outer member 10 flows downward along the gutter-like annular space and is discharged. Accordingly, it is possible to prevent muddy water etc. from flowing between the wheel mounting flange 4 and the outer member 10. Thus, high sealability can be attained.

The metal annulus 17 is press-formed of corrosion resistant steel sheet such as austenitic-stainless steel sheet, ferritic stainless steel sheet (e.g. JIS SUS 430) or preserved cold rolled steel sheet. It comprises a cylindrical fitting part 17a, a curved part 17b, an annular flat part 17c and a bent part 17d. The cylindrical fitting part 17a is fit onto a shoulder part 2c of the wheel hub 2. The curved part 17b has a circular arc cross section corresponding to the base 18 with a circular arc cross section. The annular flat part 17c extends radially outward from the curved part 17b and close contacts the inner-side surface 4b, via an elastic member 21. The bent part 17d extends radially outward from the radially outermost part of the annular flat part 17c. The bent part 17d is axially apart from the wheel mounting flange 4.

The steel sheet of the metal annulus 17 has the surface roughness Ra in a range from 0.2 to 0.6. The surface roughness "Ra" is one of the surface roughness parameters of JIS (JIS B0601-1994) and defined by an arithmetical mean coarseness that is a mean value of the absolute value deviation from a mean line. This makes it possible to have a superior seal sliding surface and to suppress lip wear and accordingly to maintain the sealing performance of the seal 8 even if used under severe conditions. In addition, the lip wear can be further suppressed and the seal torque can be reduced by applying friction coefficient reducing treatment such as molybdenum coating etc. on the surface of the metal annulus 17.

A corner portion of the inner-side base 18, between the shoulder part 2c and the wheel mounting flange 4, has a circular arc cross section of a predetermined radius of curvature "r". The curved part 17b of the metal annulus 17 has a circular arc cross section of a predetermined radius of curvature "R". The respective radii of curvatures R, r is set as R≥r. This makes it possible to prevent the curved part 17b of the metal annulus 17 from being interfered with by the circular arc part of the base 18 of the wheel mounting flange 4 and rise up therefrom when the metal annulus 17 is fit onto the base 18.

An elastic member 21 is integrally adhered to a region of the annular flat part 17c and the bent part 17d of the metal annulus 17. The member 21 elastically contacts a wall surface 18a of the base 18 of the wheel mounting flange 4. An elastic lip 21b, inclined radially outward, is integrally formed with the elastic member 21. The lip 21b extends from a tip end part 21a of the elastic member 21 adhered to a tip of the bent part 17d of the metal annulus 17 with covering therearound to the wall surface 18a of the base 18. The elastic member 21 is formed of synthetic rubber such as NBR. This makes it possible to prevent foreign matters from entering into a space between the base 18 of the wheel mounting flange 4 and the annular flat part 17c of the metal annulus 17. Thus, the generation of rust is reduced on the base 18 of the wheel mounting flange 4 on which the metal annulus 17 is fit.

In addition, the tip end 21a of the elastic member 21 adhered to the metal annulus 17 opposes the sealing member 16 adhered to the outer surface of the annular flat part 15c of the metal core 15, via a predetermined axial gap to form a second labyrinth seal 25. More particularly, an annular recessed part 24 is formed on a surface of the sealing member 16. The tip end part 21a of the elastic member 21 opposes the recessed part 24 to form a crank-shaped axial gap. This second labyrinth seal 25 makes it possible to prevent muddy water etc. entering through the first labyrinth seal 20 of the third side lip 19a from directly entering to the first side lip 16a.

According to this embodiment, a labyrinth seal is formed by the metal annulus 17 and the first side lip 16a, which is not contacted with the metal annulus 17. A double labyrinth seals 20, 25 are formed from the first labyrinth seal 20 and the second labyrinth seal 25. The first labyrinth seal 20 is formed between the tip end of the third side lip 19a and the inner-side surface 4b of the wheel mounting flange 4. The second labyrinth seal 25 is formed between the tip end of the elastic member 21 adhered to the metal annulus 17 and the sealing member 16 adhered to the outer surface of the annular flat part 15c of the metal core 15. Thus, it is possible to provide a wheel bearing apparatus that prevents muddy water etc. from directly entering into the first side lip 16a without increasing the seal torque and extend the life of the bearing by improving the sealability of the seal 8.

FIG. 3 shows a modification of the seal 8 of FIG. 2. The same reference numerals are used to designate the same structural elements of the previous embodiment and their detailed descriptions are omitted.

A seal 26 is an integrated seal comprising the metal core 15 and a sealing member 27. The metal core 15 is press-fit into the circumference of the outer-side end of the outer member 10. The sealing member 27 has a plurality of lips and is integrally adhered to the metal core 15 by vulcanized adhesion.

The sealing member 27 is formed of synthetic rubber such as NBR and is adhered to the metal core 15 in a range from the radially innermost end of the radially inner part 15b of the metal core 15 to the flanged part 15d, via the fitting part 15a and the annular flat part 15c. The sealing member 27 comprises a bifurcated first side lip 29 with a pair of lips 29a, 29b. The lips 29a, 29b incline radially outward from the radially inner part 15b of the metal core 15 and oppose the wall surface 18a of the circular arc-shaped base 18 of a wheel mounting flange 28, via an axial gap. The second side lip 16b slidingly contacts the base 18 via a predetermined axial interference. The radial lip 16c inclines radially inward from a base of the second side lip 16b. This radial lip 16c slide-contacts the outer circumference of the shoulder part 2c of the wheel hub 30, via a predetermined radial interference, to prevent leakage of grease sealed in the bearing to the outside.

An axially extending annular projection 31 is formed on the wall surface 18a of the base 18 of the wheel mounting flange 28. The projection 31 is formed so that its tip end has a vertically flat surface. It is formed with a cross section of spire-like shape. The annular projection 31 opposes the sealing member 27 adhered to the outer-side surface of the annular flat part 15c, via a predetermined axial gap S2, to form a second labyrinth seal 32. This makes it possible to prevent muddy water etc. entering through the first labyrinth seal 20 of the third side lip 19a from directly entering into the first side lip 29 without increasing the seal torque. Thus, this improves the sealability along with the labyrinth effect by the bifurcated first side lip 29.

The axial gap S2 of the second labyrinth seal 32 is slightly larger than the first labyrinth gap S1 and set in a range of 0.5 to 1.5 mm. This enables the second labyrinth gap S2 to remain as it is between the projection 31 and the sealing member 27 if a positioning accuracy of the seal 26 is set within ±0.1. This takes into consideration manufacturing variations of the thickness of the sealing member 27 as well as dimensional variations of the outer member 10 and the projection 31. On the contrary, if the second labyrinth gap S2 exceeds 1.5 mm, the labyrinth effect would be deteriorated.

The wheel bearing apparatus of the present disclosure can be applied to any one of the second to fourth generations wheel bearing apparatus of the inner ring rotation type.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus having an outer side positioned outside of a vehicle body and an inner side position inside the vehicle body comprising:

an outer member has an inner circumference and an outer circumference with a body mounting flange, the flange to be mounted on a knuckle that forms a portion of a suspension apparatus, the outer member inner circumference includes double row outer raceway surfaces;

an inner member including a wheel hub and an inner ring, the wheel hub includes a first end with a wheel mounting flange, the wheel hub has an outer circumference that includes one inner raceway surface opposing one of the outer raceway surfaces of the double row outer raceway surfaces, a cylindrical portion axially extends from the inner raceway surface, and the inner ring is press-fit onto the wheel hub, an outer circumference of the inner ring includes a second inner raceway surface opposing the other outer raceway surface of the double row outer raceway surfaces;

double row rolling elements freely rollably accommodated between the outer and inner raceway surfaces of the outer and inner members; and a seal mounted within an outer-side opening in an annular space formed between the outer member and the inner member;

the seal is formed from an integrated seal comprising a metal core and a sealing member, the metal core is fit into an outer-side end inner circumference of the outer member, the sealing member is integrally adhered to the metal core by vulcanized adhesion, the sealing member includes a plurality of sealing lips;

the metal core is press-formed from a steel sheet and comprises a cylindrical fitting part, a radial inner part, an annular flat part, and a cylindrical flange part, the cylindrical fitting part fit into the outer-side end inner circumference of the outer member, the radially inner part is bent from the fitting part and extends radial inward, the annular flat part extends radially outward from an outer-side end of the fitting part and contacts the outer-side end face of the outer member, and the cylindrical flange part is formed on the radially outermost end of the annular flat part and extends toward the outer member;

the sealing member is formed from synthetic rubber and adhered to the metal core in a range from the radially innermost end of the radially inner part to the flanged part;

the sealing member comprises a first side lip, a second side lip, a third side lip and a radial lip, the first side lip is inclined radially outward from the radially inner part of the metal core, the first side lip opposes an inner-side base of the wheel mounting flange, via an axial gap, the second side lip is formed radially inward of the first side lip, the second side lip is in sliding contact with a surface as the second side lip extends toward the wheel mounting flange, via an axial interference, the radial lip extends from a base of the second side lip and is inclined radially inward toward the inner side, the third side lip is adhered to the flanged part of the metal core, the third side lip covers the entire surface of the flanged part and extends radially outward from its base toward the wheel mounting flange;

a tip end of the third side lip is formed with a vertically flat surface opposing the inner-side surface of the wheel mounting flange via an axial gap to form a first labyrinth seal; and a second labyrinth seal is formed at a position between the first labyrinth seal and the first side lip opposing the inner-side base of the wheel mounting flange via an axial gap.

2. The wheel bearing apparatus of claim 1, wherein the outer member has a first outer diameter and a smaller diameter part, the smaller diameter part having a diameter smaller than the first outer diameter, the smaller diameter part is on an outer-side of the outer member, and a tapered part connect the two and a radially inwardly projecting annular projection is formed on a base of the sealing member, the annular projection is in elastic contact with the small diameter part.

3. The wheel bearing apparatus of claim 1, wherein a metal annulus is fit on the inner-side base of the wheel mounting flange, the seal opposes the metal annulus, the annulus is press-formed from a steel sheet and comprises a cylindrical fitting part, a curved part, an annular flat part and a bent part, the cylindrical fitting part is fit onto a shoulder part of the wheel hub, the curved part has a circular arc cross section corresponding to a circular arc cross section of the inner side base of the wheel mounting flange, the annular flat part extends radially outward from the curved part and contacts an inner-side surface of the wheel mounting flange, via an elastic member, the bent part extends radially outward from the radially outermost part of the annular flat part and axially apart from the wheel mounting flange, and the inner-side base of the wheel mounting flange circular arc cross section has a radius of curvature (r) and the curved part of the metal annulus has a circular arc cross section with a radius of curvature (R) where respective radii of curvatures (R), (r) are set as R≥r.

4. The wheel bearing apparatus of claim 3, wherein a friction coefficient reduction treatment is performed on a surface of the metal annulus.

5. The wheel bearing apparatus of claim 3, wherein a synthetic rubber elastic member is integrally adhered to a region of the annular flat part and bent part of the metal annulus and it elastically contacts a wall surface of the base of the wheel mounting flange, an elastic lip is inclined radially outward, the elastic lip is integrally formed on the elastic member and extends from a tip end part of the elastic member toward the wall surface of the base, the tip end part of the elastic member is adhered to and covers a tip of the bent part of the metal annulus.

6. The wheel bearing apparatus of claim 5, further comprising an annular recessed part formed on a surface of the sealing member, and the tip end part of the elastic member faces the recessed part, via an axial gap, to form the second labyrinth seal.

7. The wheel bearing apparatus of claim 1, further comprising an axially extending annular projection formed on a wall surface of the inner-side base of the wheel mounting flange, the annular projection has a tip end with a vertically flat surface, the annular projection opposes the sealing member, via an axial gap, to form a labyrinth seal.

8. The wheel bearing apparatus of claim 1, further comprising a bifurcated tip end on the first side lip that forms a pair of lips.

\* \* \* \* \*